United States Patent [19]
White et al.

[11] Patent Number: 5,448,676
[45] Date of Patent: Sep. 5, 1995

[54] ELECTRO-OPTICAL CONTACT COUPLING

[75] Inventors: John A. White, Orange; John J. Marcin, Westminster, both of Calif.

[73] Assignee: McDonnell Douglas Corporation, Huntington Beach, Calif.

[21] Appl. No.: 79,284

[22] Filed: Jun. 21, 1993

[51] Int. Cl.$^6$ .............................................. G02B 6/42
[52] U.S. Cl. .................................... 385/88; 385/92; 385/84; 439/580; 257/99
[58] Field of Search .............................. 385/88–94, 385/84; 250/227.14, 227.15, 227.17, 227.24; 257/79, 98, 99, 100; 439/577, 580

[56] References Cited
U.S. PATENT DOCUMENTS

| | | | |
|---|---|---|---|
| 3,809,908 | 5/1974 | Clanton | 385/88 X |
| 3,878,397 | 4/1975 | Robb et al. | 385/88 |
| 4,798,441 | 1/1989 | Clark | 385/88 |
| 4,976,632 | 12/1990 | Riches et al. | 439/580 |

*Primary Examiner*—Rodney B. Bovernick
*Assistant Examiner*—Phan T. H. Palmer
*Attorney, Agent, or Firm*—Donald E. Stout; John P. Scholl; Roger C. Turner

[57] ABSTRACT

An electro-optical contact assembly provides a connection between an electrical system and a fiber optic system for transmission of a signal therethrough. The assembly includes a converter for converting the signal between electrical and optical forms. The assembly also includes a receptacle with a retention mechanism mounted thereon which allows secure retention of an optical fiber terminus in the receptacle. The retention mechanism allows manual release of its clip from engagement with the optical fiber terminus in order to allow removal of the terminus from the receptacle, thereby allowing optical connection and disconnection of the assembly from the electrical system as well as other systems by simply plugging and unplugging fiber optic termini into and out of the contact assembly. The assembly includes a conductor surrounding the receptacle and terminus to provide EMI and RFI shielding of the terminus. The assembly also includes a thermoelectric structure thermally connected to the converter for cooling of a laser in the converter.

23 Claims, 6 Drawing Sheets

ELECTRO-OPTICAL CONTACT COUPLING

BACKGROUND OF THE INVENTION

The invention relates generally to contact coupling assemblies and, more particularly, to a contact coupling assembly which provides an interface between an electrical system and a fiber optic system.

Because of their inherent capability of transmitting more data than a comparably sized electrical wire, fiber optic cable transmission lines have become more widely used. Since fiber optic cables do not produce electromagnetic interference and are not susceptible to radio frequency interference, they have become more desirable in avionic systems and many other types of systems in which noise interference can cause malfunction thereof. However, fiber optic cable transmission systems have an important disadvantage which is that their connections require precise alignment and scrupulous cleanliness in order to function properly. This disadvantage of fiber optic cable systems has, to a certain degree, obviated the advantages such systems have and prevented them from widespread use.

Some conventional fiber optic contact assemblies utilize diodes which employ pin contact pairs. Since such conventional contact assemblies are bulky and complex in construction, some prior art electro-optical transmission systems have been designed to utilize a simpler, generally standard electrical connector member. Examples of such electro-optical transmission lines are disclosed in U.S. Pat. No. 3,809,908 to Clanton and U.S. Pat. No. 3,878,397 to Clanton et al. The transmission line of the Clanton devices employ an optical fiber bundle with an integrated coaxial electrical contact assembly at each end of the bundle. The Clanton devices also employ a radiation emitting device at one end of the assemblies and an infrared photo diode at the other end in order to convert the signal to an optical signal from an electrical signal or to convert an electrical signal from an optical signal, depending on the particular end of the transmission line where the converter is located. The coaxial contact assemblies allow the Clanton line to be plugged directly into an electrical system. However, a primary disadvantage with the Clanton transmission line is that the fiber optic bundle is permanently secured in the contact assemblies necessitating that the line be directly plugged into an electrical system in order to allow signal transmission thereto. In addition, the Clanton transmission line must be installed as one assembly which can be difficult when connecting modular structures.

Other prior art optical transmission systems employ means to alter the transmission characteristics of the optical transmission line in order to accommodate the particular needs of the electrical system to which the optical transmission system is connected. An example of such an optical transmission system is disclosed in U.S. Pat. No. 4,691,368 to Eumurian, et al. The Eumurian system incorporates a pair of frequency compensating electrical circuits at each end of the optical transmission line terminal to accentuate high frequencies attentuated by the optical transmission line and to permit operation in a widened frequency band. However, a disadvantage of such systems is that incorporation of the electrical circuitry in the assembly substantially increases the cost and complexity of the assembly and decreases its reliability. In addition, the optical cables are permanently secured to the assemblies requiring that the entire connector assembly be plugged or unplugged directly to or from an electrical system.

In aircraft applications, periodic inspection of electrical and optical connections is typically required. For prior art electro-optical assemblies in Which the fiber optic cable is permanently secured to the connector assembly, inspection of the optical surfaces of the termini is not possible. For blind mate optical connector systems used in many avionic systems, frequent mating and unmating of the connectors result in failures or malfunctions of the interconnects. These failures and malfunctions include damage to or contamination of the optical surfaces, bent termini, cracked connector inserts and connector shells and failure of the termini retention mechanism allowing terminus pushback. Connectors typically generate minute particles of the base materials when the mating surfaces thereof rub against each other. These particles have been shown to cause failure in some optical interconnects. The particles can pit the optical surfaces, fracture the optical components within the connector and block the optical signal as it is propagating from one termini to the other. For this reason, it is imperative, particularly in aircraft applications where reliability is of utmost importance, that the optical surfaces of the connectors be carefully cleaned to eliminate such contaminating minute particles. However, blind mate connectors used in aircraft are often placed in areas where cleaning of the surfaces thereof is impractical or impossible. However, most of the blind mate interconnect components currently available are not easily cleaned and some require that the termini be removed and/or some parts removed, reassembled and re-inserted into the connector cavity for proper cleaning thereof. But, this process subjects the termination to possible contamination or possible damage since the wiring areas of equipment racks are cramped and sometimes do not have sufficient access to allow the proper use of tools.

What is therefore needed is an electro-optical contact coupling assembly in which the fiber optic termini thereof may be termini, cracked connector inserts and connector shells and failure of the termini retention mechanism allowing terminus pushback. Connectors typically generate minute particles of the base materials when the mating surfaces thereof rub against each other. These particles have been shown to cause failure in some optical interconnects. The particles can pit the optical surfaces, fracture the optical components within the connector and block the optical signal as it is propagating from one termini to the other. For this reason, it is imperative, particularly in aircraft applications where reliability is of utmost importance, that the optical surfaces of the connectors be carefully cleaned to eliminate such contaminating minute particles. However, blind mate connectors used in aircraft are often placed in areas where cleaning of the surfaces thereof is impractical or impossible. However, most of the blind mate interconnect components currently available are not easily cleaned and some require that the termini be removed and/or some parts removed, reassembled and re-inserted into the connector cavity for proper cleaning thereof. But, this process subjects the termination to possible contamination or possible damage since the wiring areas of equipment racks are cramped and sometimes do not have sufficient access to allow the proper use of tools.

What is therefore needed is an electro-optical contact assembly in which the fiber optic termini thereof may be easily removed therefrom for inspection and cleaning. An electro-optical contact assembly is also needed which utilizes generally standard electrical contact components allowing the assembly to be easily connected to various electrical systems.

SUMMARY OF THE INVENTION

It is a principal object of the present invention to provide a contact assembly for interfacing an electrical system with a fiber optic system in which the fiber optic terminus may be removed therefrom for inspection and cleaning with minimal likelihood of contamination of optical surfaces thereof.

It also an object of the present invention to provide a contact assembly for interfacing an electrical system with a fiber optic system which utilizes a generally standard electrical contact to allow the assembly to be connected to a variety of different types of electrical systems.

It is also an object of the present invention to provide a contact coupling assembly for interfacing an electrical system with a fiber optic system which does not result in a signal loss.

It is also an object of the present invention to provide a contact assembly for interfacing an electrical system with a fiber optic system which does not result in electrical/optical signal degradation.

It is also an object of the present invention to provide a contact assembly for interfacing an electrical system with a fiber optic system which minimizes HIRF (High Intensity Radiated Fields), EMI and RFI.

It is also an object of the present invention to provide a contact assembly for interfacing an electrical system with a fiber optic system which utilizes a heat sink in order to allow the effective use of a laser device for electro-optical transmission of a signal.

It is also an object of the present invention to provide a contact assembly for interfacing an electrical system with a fiber optic system which allows access to electro-optic devices utilized therein for maintenance or system verification/validation.

The contact assembly of the present invention provides an interface between an electrical system, such as an avionics system, and a fiber optic system in order to interconnect two electrical systems via the fiber optic system. The contact assembly is specifically designed to allow easy removal of the fiber optic cable terminus from the assembly using a simple standard tool. This removability of the fiber optic terminus allows easy inspection, cleaning and assembly thereof while minimizing contamination of the optical termini faces. This removability feature also allows connection and disconnection of the electrical systems to and from other electrical systems by simply plugging and unplugging the fiber optic termini into and out of the assemblies. Additionally, the electro-optic devices are easily accessed providing for test and verification of electro-optic performance simply by removing the electro-optical contact assembly from the avionics connector and removing the fiber optic terminus. The device can be tested, reinstalled or replaced as required. This is a significant advantage over prior art systems which require equipment removal and disassembly to check electro-optic devices. This is also a significant advantage over some of the prior art systems described hereinabove in which the electro-optic devices cannot be tested at all because of their integral assembly design.

The contact assembly of the present invention includes a housing in which an electrical contact for electrical connection to an electrical system of the aircraft is mounted. The assembly also includes a converter for converting an electrical signal to an optical signal or for converting an optical signal to an electrical signal. The electrical contact is directly connected to the converter which is mounted within the housing of the electrical contact. The contact assembly also includes an optical terminus receptacle which is positioned within the housing at a location therein in which it is adjacent the converter and generally opposite the electrical contact. The receptacle receives a fiber optic terminus therein. A retention means is mounted on the receptacle and generally securely retains the terminus in a desired position within the receptacle so that the terminus is axially aligned with the converter. When used with a 16 gauge fiber optic connector, the retention means generally mates with a ridge on the terminus so that engagement of the retention clip with the ridge generally securely retains the terminus in the desired position. The converter and receptacle are preferably mounted in a suitable mount which is, in turn, mounted within the housing. The mount is dimensioned and positioned within the housing relative to the receptacle so that it generally holds the converter and receptacle in a desired position in which the converter is in a desired position of lateral and axial alignment with the terminus when the terminus is inserted in the receptacle. Thus, one end of the assembly is connected to a fiber optic system while the other end of the assembly is connected to an avionic system or other electrical system. The electro-optical converter which may be, for example, a light-emitting diode or a photo-diode, can allow either data to be transmitted from the avionic system into the fiber optic system or from the fiber optic system into the avionic system, as desired.

A second embodiment of the invention specifically designed for instances where the AOC is used with a triaxial connector utilizes a conducting member which generally surrounds the receptacle and cable terminus (at a location thereof where the terminus is inserted in the receptacle) for shielding the terminus, converter and interconnections and thereby preventing HIRF, EMI and RFI from adversely affecting signal transmission as well as electrical system components. The conducting member is preferably mounted on a connector body and preferably also grounded through the connector body. Thus, when the housing is properly inserted into the connector body, the conducting member will generally cover the fiber optic terminus and the converter, thereby preventing HIRF, EMI and RFI.

The second embodiment also preferably includes a thermoelectric structure which is preferably thermally connected to the converter via thermally conducting portions of the housing and the mount. The thermoelectric structure is preferably integral with the connector and positioned so that it generally surrounds the converter when the housing is properly inserted in the connector. The thermoelectric structure includes a thermal conductor which in combination with thermally conducting housing portions and the mount function generally as a heat sink for the converter. Utilization of the heat sink allows the use of a suitable laser device in the converter. Without a heat sink a laser device would produce excessive heat which would otherwise shorten its life, adversely affect its optical output characteristics and/or adversely affect other components of the assembly or other components of the electrical system. Incorporation of the heat sink also allows the utilization of other components which require temperature compensation (other than laser devices) to be used in the assembly.

The electro-optical contact assembly of the present invention thus provides a means for simply and relatively inexpensively interfacing an electrical system such as an avionic system with a fiber optic cable. In addition, the contact assembly of the present invention has the desirable features of preventing HIRF, EMI and RFI. Moreover, the contact assembly allows the utilization of a laser device or other converter device requiring temperature compensation to be utilized and further allows a fiber optic cable to be easily removed therefrom for inspection and maintenance, as well as for connection or disconnection of the assembly to or from various other systems.

DETAILED DESCRIPTION OF THE PREFERRED EMBODIMENT

Figure 1:
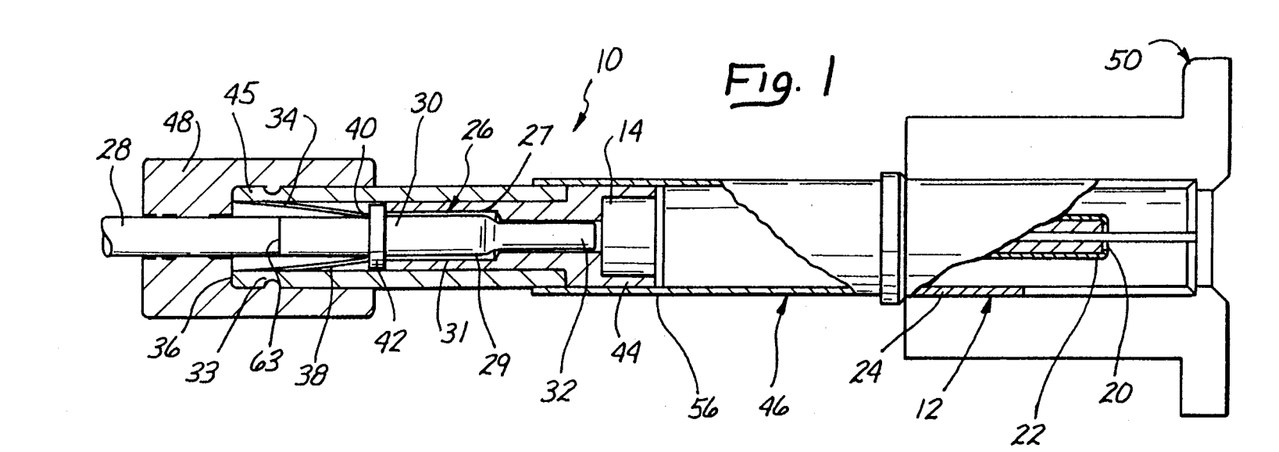
FIG. 1 is a longitudinal sectional view of a first embodiment of the contact assembly of the present invention shown with a fiber optic terminus connected thereto.
Figure 2:
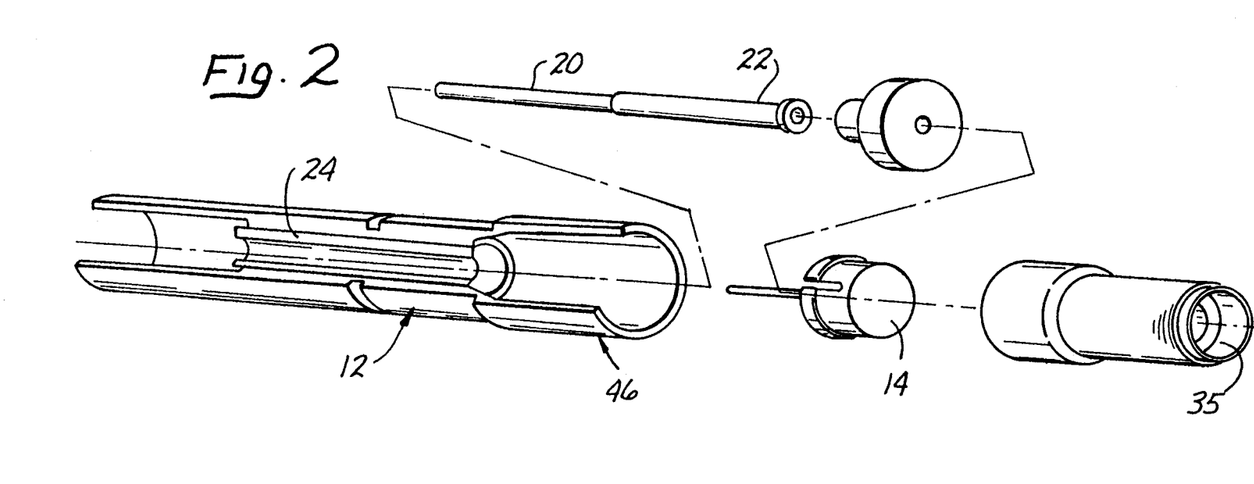
FIG. 2 is an exploded view of the first embodiment of the contact assembly of the present invention.
Figure 3:
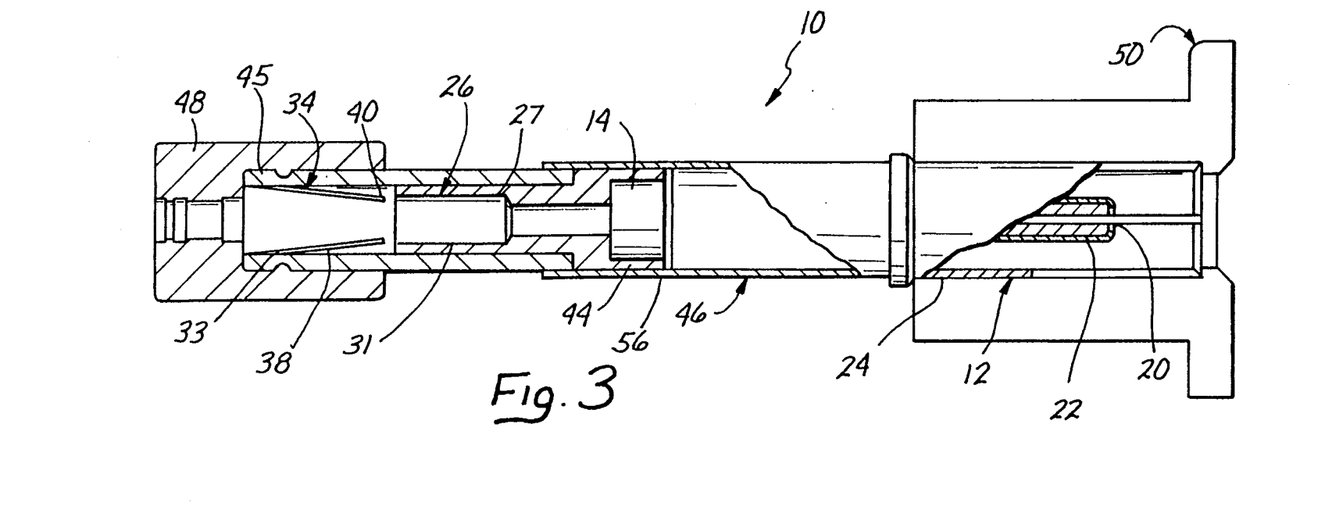
FIG. 3 is a longitudinal sectional view of the first embodiment of the contact assembly of the invention without an optical fiber and a terminus connected thereto.
Figure 4:
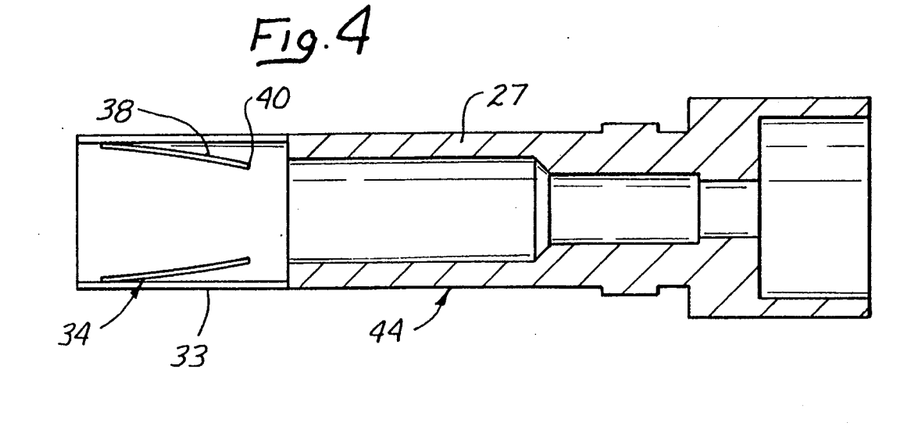
FIG. 4 is a longitudinal sectional view of a mount of the first embodiment of the contact assembly of the invention also representative of the mount of the second embodiment of the contact assembly of the invention.

Referring now to the drawings, there is shown a first embodiment of the electro-optical contact assembly invention generally designated by the numeral 10. The contact assembly 10 preferably includes an electrical contact 12 which is adapted to be connected into preferably an electrical avionic unit or any other type of suitable electrical system. The electrical contact 12 is preferably a triaxial contact as shown in FIGS. 1, 2 and 3, although it may also be or any other type of contact suitable for the particular electrical system to which it is connected.

Figure 8A:
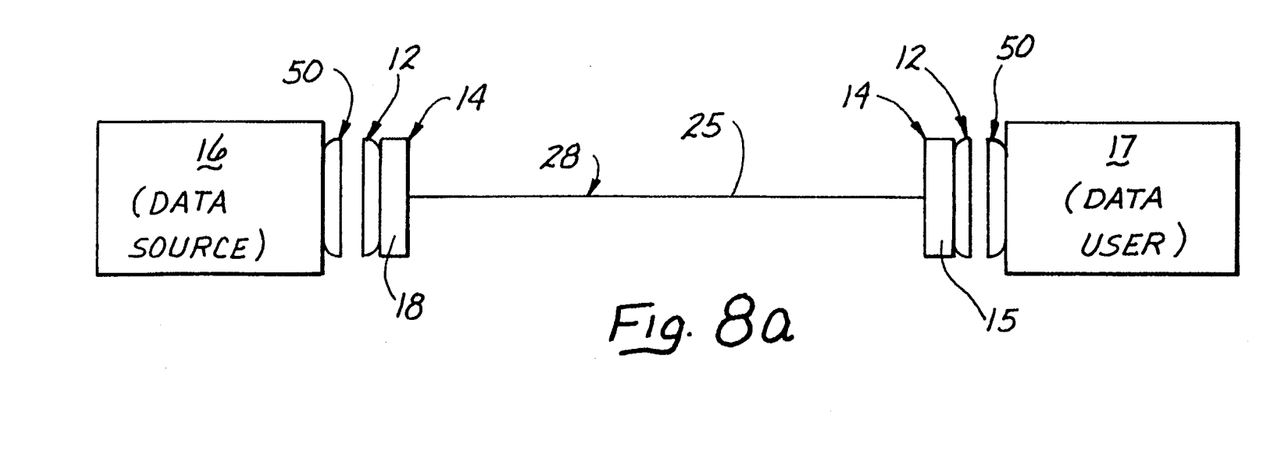
FIG. 8A is a diagram showing data flow of two electrical systems interconnected by a pair of contact assemblies of the first embodiment of the present invention and by an optical fiber.
Figure 8B:
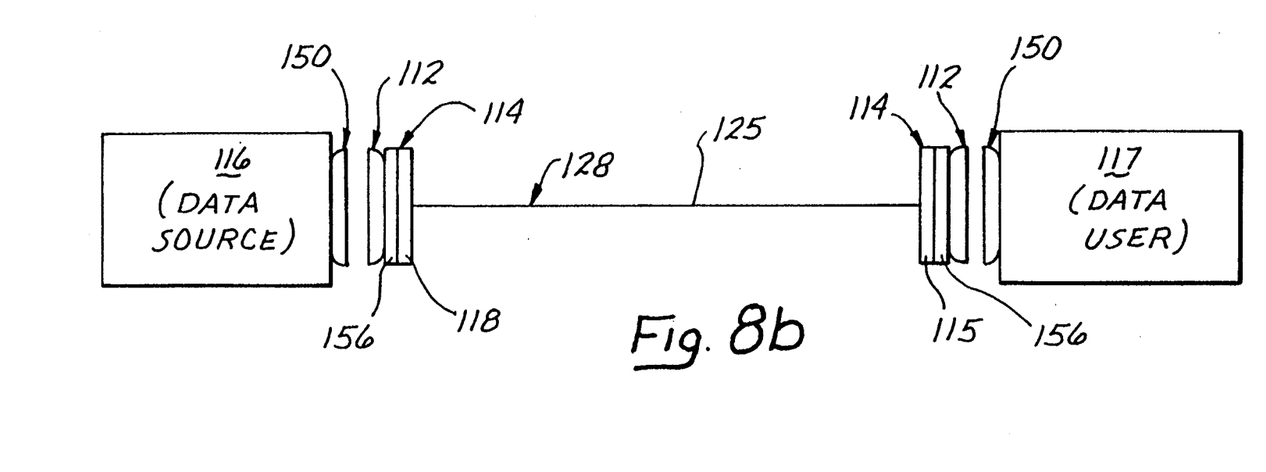
FIG. 8B is a diagram showing data flow of two electrical systems interconnected by a pair of contact assemblies of the second embodiment of the present invention and by an optical fiber.

The assembly 10 also preferably includes an electro-optic converter 14 which converts the signal passing to or from the electrical system 16 and 17 to or from an electrical or optical form. Consequently, the converter 14 is preferably a laser, light-emitting diode or edge-emitting diode 18 when used to transmit a signal including data from the electrical system 16 or the converter 14 is preferably a photo diode or photo transistor 15 when used to transmit a data signal into the electrical system 17, as shown in FIG. 8A. Thus, the converter 14 is essentially a photo-optical device and is electrically connected to the electrical contact 12 for transmission of the signal therebetween. The electrical contact 12 preferably includes an inner pin 20, an intermediate pin 22 and an outer pin 24 for electrical connection to the electrical systems 16 and 17. The converter 14 is preferably protected from HIRF, EMI and RFI by grounding contact 12.

The assembly 10 preferably also includes an optical terminus receptacle 26 which is preferably positioned adjacent and proximal the converter 14 at a side thereof located opposite the electrical contact 12, as shown. The receptacle 26 preferably receives an optical fiber 28 therein and, more specifically, receives a terminus 30 of the optical fiber 28 therein. The receptacle 26 is preferably generally cylindrical and generally holds the terminus 30 and end 32 in a desired position relative to the converter 14 to facilitate signal transmission therebetween. The terminus end or ferrule end 32 is preferably generally in close proximity to but not in contact with the converter 14; however, the ferrule end 32 may also be in contact with the converter 14 without compromising transmission of the optical signal therebetween. The terminus end 32 is preferably polished, as is conventionally done, in order to ensure optimum optical transmission therefrom or thereto; however, other glass preparations such as cleaving or using an expanded beam device are generally equally effective. In order to securely retain the terminus 30 in the receptacle 26 in a desired position in which the terminus 30 is in contact with converter 14 or in which there is a desired separation gap between converter 14 and terminus 30, a retention means 33 is preferably provided and mounted in the receptacle 26. The retention means 33 preferably comprises a retention clip 34 connected to the receptacle 26 at a end portion 36 thereof. The retention clip 34 preferably includes fingers 38 which have end portions 40. Fingers 38 extend generally forwardly and inwardly from end portions 36 so that finger end portions 40 properly engage and mate with a ridge 42 of the terminus 30. The fingers 38 and the clip 34 are preferably dimensioned so that the clip 34 generally securely retains the terminus 30 in a desired position of proximity i.e., axial alignment, to the converter 14, as shown in FIG. 1. The receptacle 26 also includes a collar 27 which preferably snugly fits around and generally surrounds a protuberance or enlarged portion 29 (portion 29 is preferably diametrically larger than the end 32) of the terminus 30 to thereby restrict axial movement of the terminus 30 relative to the receptacle 26 in the area of the protuberance 29 and retain the terminus 30 in a desired position within the receptacle 26. The receptacle 26 also is diametrically dimensioned so that the terminus 30 snugly fits therein thereby restricting excessive axial movement of the terminus 30 relative to the converter 14 and enhancing axial alignment of the terminus 30 therewith.

Contact assembly 10 preferably also includes a converter mount 44. Both the converter 14 and the receptacle 26 are preferably mounted in the mount 44. The mount 44 preferably generally holds the converter 14 in a desired position relative to the receptacle 26 (and thereby the terminus 30) thereby ensuring that the converter 14 is in the desired position of generally lateral alignment with the terminus 30 in order to allow proper transmission of a signal between the converter 14 and the cable 28. The assembly 10 preferably also includes a housing 46 within which the mount 44, electrical contact 12, converter 14 and receptacle 26 are mounted. At least a portion of the housing 46 is inserted in a connector 50 for electrical connection to the electrical system 16 or 17.

A simple hand tool (not shown) may be inserted into the receptacle 26 while the terminus 30 is connected thereto in order to release the retention clip 34, thereby allowing manual removal of the optical fiber 28 and terminus 30 from the receptacle 26. Alternatively, however, other suitable release mechanisms may also be used. This removability feature provided by the releasable retention means 34 allows the optical fiber terminus to be easily removed from the assembly 10 for inspection and/or cleaning. The removability feature also allows the contact assembly 10 to remain connected to the electrical system 16 while fiber optic systems are plugged or unplugged thereinto or therefrom, thereby allowing selected connection or disconnection of the electrical system 16 to or from electrical system 17 or to or from other electrical systems, as desired. This feature also enables the assembly 10 to be serviced separately from the fiber optic system 25 or the electrical systems 16 and 17.

A grommet 48 is preferably also provided in order to prevent dirt, moisture, fluids and other contaminants from getting into the terminus/receptacle portion of the assembly and contaminating the terminus end 32 or the converter 14, thereby disrupting transmission of the signal therebetween. The grommet 48 is preferably mounted on the housing 46 at the receptacle 26 end portion thereof and preferably generally environmentally seals the housing aperture 35 when the terminus 30 is inserted in the aperture 35 as well as for providing additional support to the terminus rear portion 63. An SMA type of terminus receptacle may alternatively be utilized instead of the 16 gauge type, as shown in FIG. 2.

Figure 5:
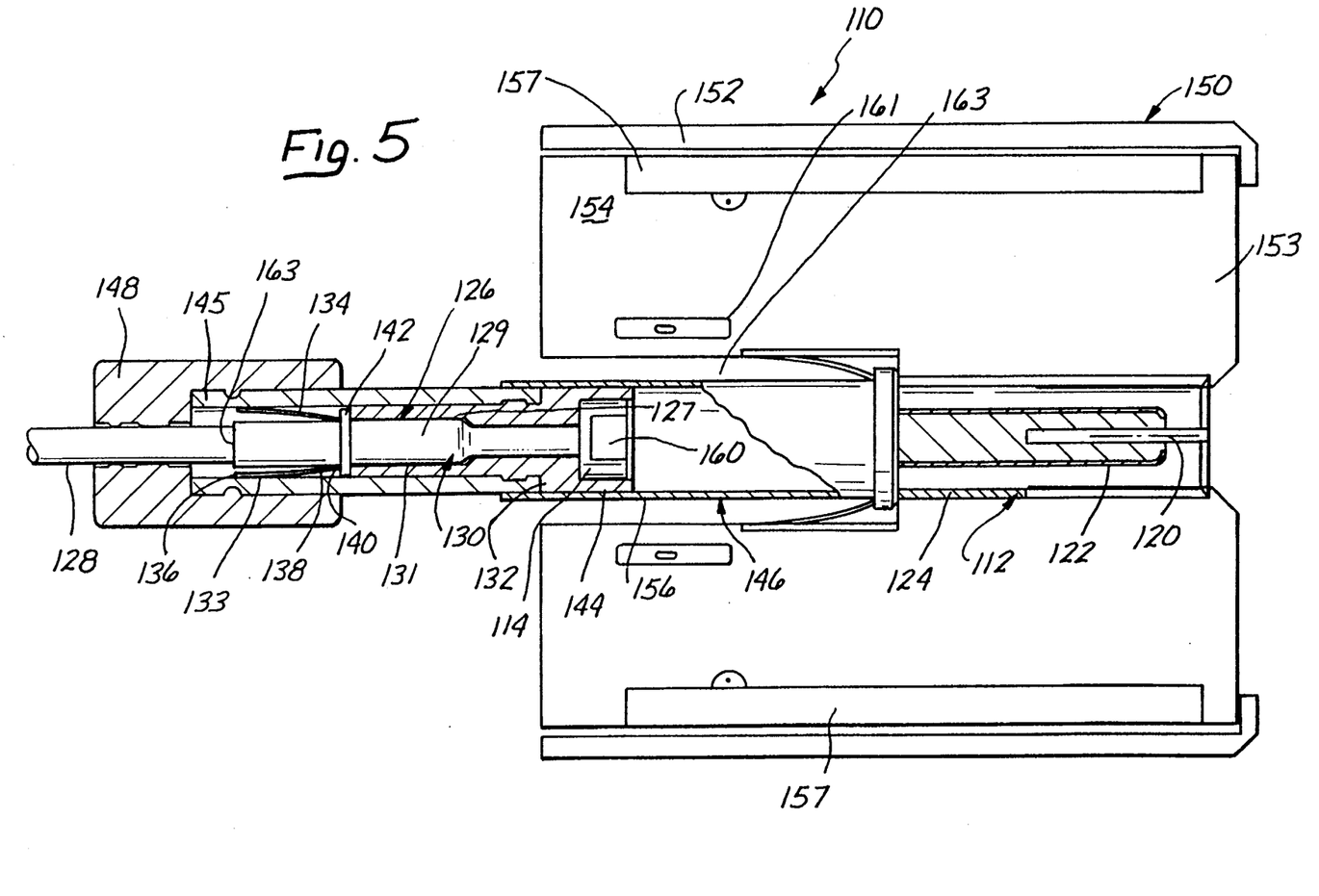
FIG. 5 is a top longitudinal sectional view of a second embodiment of the contact assembly of the present invention showing a fiber optic terminus connected thereto.
Figure 6:
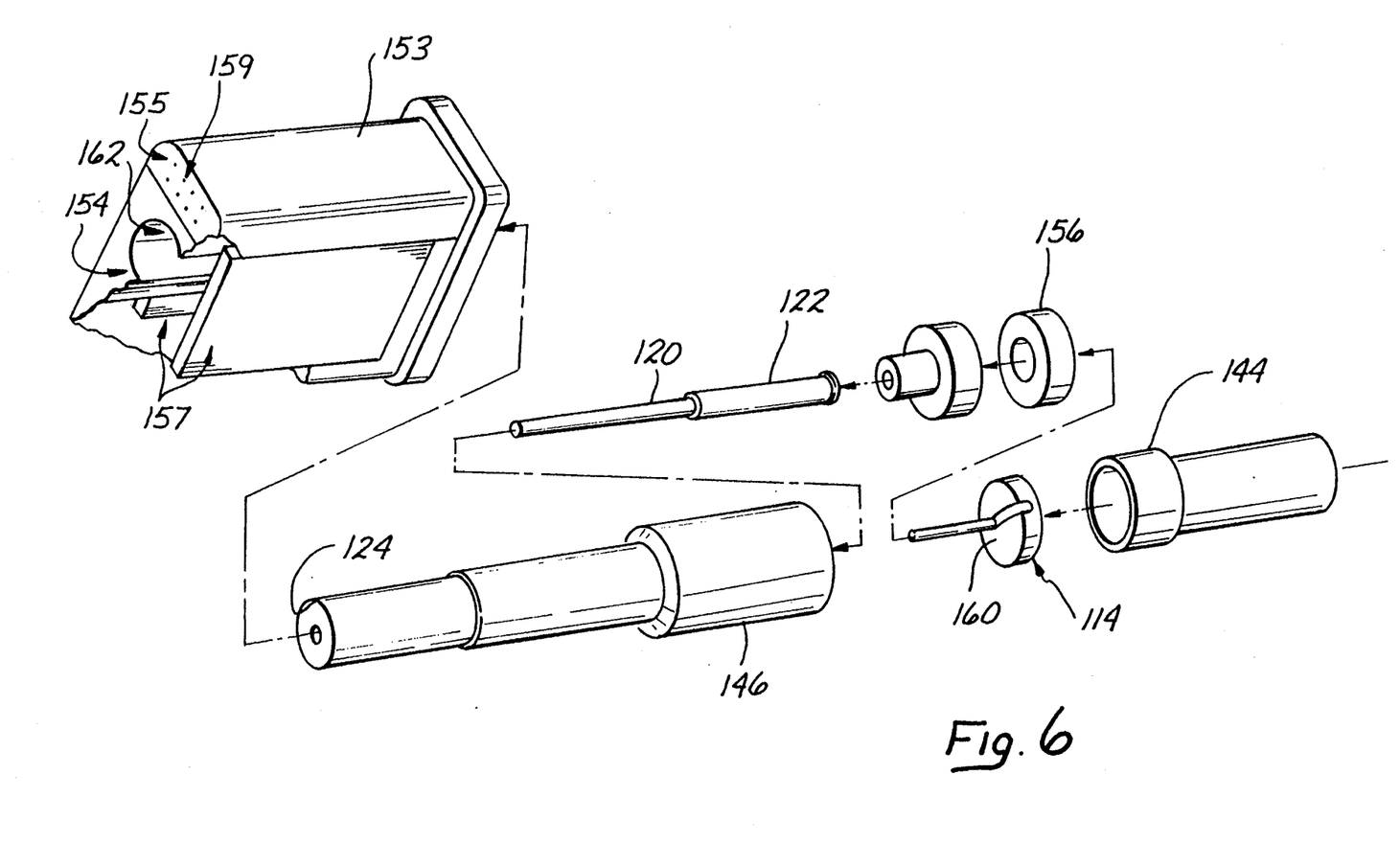
FIG. 6 is an exploded view of the second embodiment of the contact assembly of the present invention.
Figure 7:
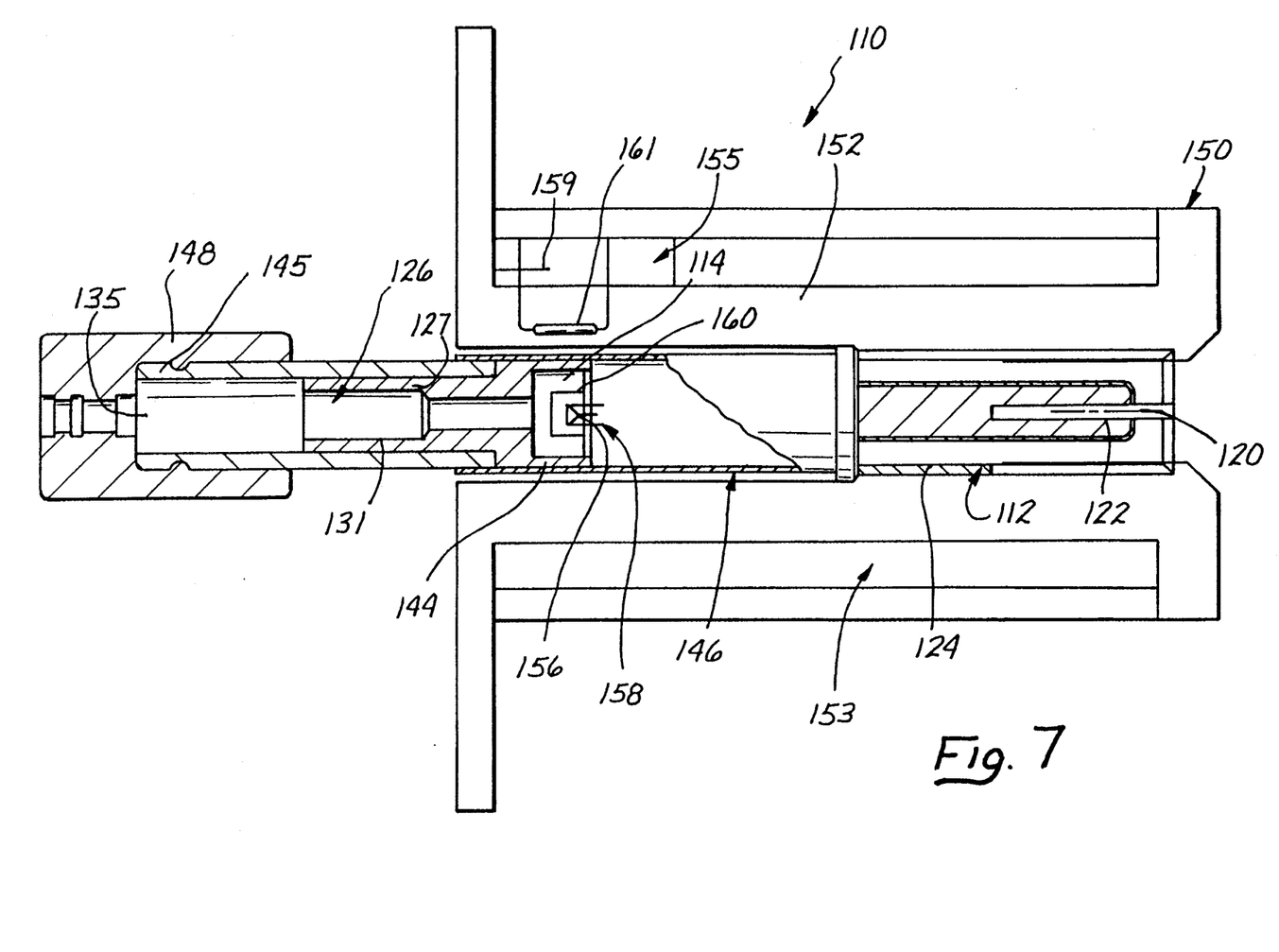
FIG. 7 is a side longitudinal sectional view of the second embodiment of the contact assembly of the present invention without an optical fiber and a terminus connected thereto.

A second embodiment 110 of the invention is shown in FIGS. 5, 6 and 7. Embodiment 110 includes a connector 150 which preferably receives at least a portion of the housing 146 therein, as shown in FIG. 5. Embodiment 110 is generally similar to embodiment 10 except that connector 150 preferably includes a thermoelectric structure 153. The thermoelectric structure 153 is dimensioned and positioned so that it generally covers the receptacle 126 (and, more specifically, the terminus 130) when the housing 146 is installed in the connector 150 and when the terminus 130 is inserted in the receptacle 126. The terminus 130 which is typically metallic may be a source of HIRF, EMI and RFI which may disrupt functioning of computer components as well as other sensitive circuitry of the electrical system 16. Therefore, the thermoelectric structure 153 is provided with an electrical (and thermal) conducting member 154 which generally surrounds the converter 114 and the terminus 130 so that it generally provides electromagnetic shielding of the terminus 130 and converter 114 in order to generally eliminate such HIRF, EMI and RFI. The conducting member or conductor 154 is thus preferably grounded, preferably metallic and preferably generally surrounds the receptacle 126 and terminus 130 when inserted therein, as shown in FIG. 7. Additionally, the connector 150 is provided with an electrically conducting connector shell 152 which is also grounded and provides secondary shielding of the converter 114 and terminus 130.

The thermoelectric structure 153 includes the conductor 154 as well as preferably two heat pumps 157 (which are utilized to cool the laser 160) mounted on the connector 150 and specifically adapted to accommodate and allow the use of a converter 114 which preferably utilizes a laser device 160. The laser device 160 typically generates heat which if uncontrolled can cause the laser device 160 to malfunction or cease to function. Therefore, the thermal conductor 154 is preferably thermally connected to the heat pumps 157, housing 146, the mount 144, and in turn the converter 114 in order to draw heat from the converter 114 (more specifically from the laser 160) in order to ensure proper operation of the converter 114 and prolong its useful life. The thermal conductor 154 is preferably thermally connected to a thermally conductive (preferably metallic) portion of the connector 150 in order to enhance heat conduction and dissipation therefrom. The connector 150 is preferably thermally connected to a connector mounting system or rack so that the connector 150 (and thermal conductor 154) can transfer heat thereto. The thermal conductor 154 preferably is positioned so that it generally surrounds the housing 146 and portions of the mount 144 adjacent the converter 114 when the housing 146 is installed in the connector cavity 162. Alternatively, instead of utilizing an integrated thermal and electrical conductor 154, the connector 150 may utilize two separate structures for providing thermal conduction and EMI shielding.

The thermoelectric structure 153 also preferably includes a dielectric structure 155 within which are mounted dielectric structure electrical contacts 159 and thermal sensors 161. There are preferably 8 electrical contacts 159 four of which are connected to the sensors 161 which monitor the temperature of the laser 160 and the other four of which are connected to the heat pumps 157 in order to control cooling of the laser 160. The contacts 159 are preferably connected to an electrical power source (not shown) which may be located in an avionic or electrical system to which the assembly 110 is connected. Optionally, a control circuit (not shown) may be mounted within the dielectric structure 155 to sense the temperature of the laser 160 using sensors 161 and regulate the current to the heat pumps 157; the sensor pins would thus be used both for electrical power and sensing information.

Contact assembly 110 preferably also includes electrical contact 112 which is preferably a triaxial contact having central or inner socket 120, medial contactors 122 and outer socket 124. The contact assembly 110 also preferably includes a retention means 133 having a clip 134 preferably having fingers 138 with ends 140 structured to mate with ridge 142 of cable terminus 130. The clip 134 is preferably attached to an end portion 136 of the receptacle 126. The receptacle 126 also includes a collar 127 which generally surrounds a protuberance or enlarged portion 129 on the terminus 130 in order to thereby generally restrict axial movement of the terminus 130 relative to the receptacle 126 at the area of the protrusion 129. The enlarged portion 129 is preferably diametrically larger than terminus end 132. As with embodiment 10, the inner diameter of receptacle 126 is also selected so that it enhances axial alignment of the terminus 130 relative to the converter 114.

Embodiment 110 is designed to be used in conjunction with a fiber optic system 125 using an optical fiber 128 having a terminus 130 and a terminus end or face.132. Embodiment 110 preferably also includes an amplifier 156 for amplifying the electrical signal transmitted either from the electrical contact 112 into the converter 114 or out of the converter 114 and into the electrical contact 112. The amplifier 156 is preferably positioned within the converter 114 and electrically interconnects the converter 114 and the electrical contact 112 and connected to the contact by means of amplifier leads 158. Embodiment 110 also includes a grommet 148 for generally sealing the housing aperture 135 when the terminus 130 is inserted in the receptacle 126 as well as for providing additional support to the terminus rear portion 163 relative to the end portion 145 of the housing 146. In all respects other than as noted hereinabove, embodiment 110 is identical to embodiment 10 so its further functional and structural description will not be repeated to promote brevity.

Accordingly, there has been provided, in accordance with the invention, a contact assembly for interfacing a fiber optic system with an electrical system which is relatively simple in construction, easy to maintain and which provides efficient signal transmission between electrical systems with which it is used. It is to be understood that all the terms used herein are descriptive rather than limiting. Although the invention has been described in conjunction with the specific embodiments set forth above, many alternative embodiments, modifications and variations will be apparent to those skilled in the art in light of the disclosure set forth herein. Accordingly, it is intended to include all such alternative embodiments, modifications and variations that fall within the spirit and scope of the invention as set forth in the claims hereinbelow.

We claim:

1. An electro-optical contact coupling assembly, comprising:
    a housing;
    a converter for conversion of a signal between electrical form and optical form;
    an electrical contact electrically connected to said converter, said contact having a socket for electrically interfacing said converter with an electrical system, said contact being mounted within said housing;
    a receptacle for removably receiving an optical fiber terminus therein, said receptacle being mounted in said housing and positioned adjacent said converter in order to facilitate transmission of the signal between said converter and the terminus;
    a retention means mounted on said receptacle, said retention means being shaped and dimensioned to provide a desired axial alignment of the terminus with said converter; and
    a connector which includes a conductor and receives at least a portion of said housing therein, said connector being adapted to generally cover the terminus and the converter for EMI and RFI shielding thereof.

2. The assembly of claim 1 further including a mount mounted in said housing, said converter and said receptacle mounted in said mount and positioned so that said converter is in general lateral alignment with said receptacle in order to facilitate signal transfer between the terminus and said converter.

3. The assembly of claim 1 wherein said converter includes a diode for converting the signal from optical form to electrical form.

4. The assembly of claim 1 wherein said receptacle includes a collar dimensioned to snugly fit around an enlarged portion of the terminus when the terminus is inserted in said receptacle, said collar having a diameter larger than a receptacle portion snugly fitting around an end portion of the terminus when the terminus is inserted in said receptacle.

5. The assembly of claim 1 wherein said converter includes a laser.

6. The assembly of claim 1 wherein said retention means engages the terminus, said retention means including a retention clip for mating with a ridge of the terminus in order to secure the terminus in the desired position relative to said converter, said retention means allowing manual release thereof to facilitate removal of the terminus from said receptacle.

7. The assembly of claim 1 wherein said conductor is thermally connected to said converter when the portion of said housing is inserted in the connector for drawing heat from said converter.

8. The assembly of claim 1 further including an amplifier mounted within said housing and interconnecting said converter and said contact for amplifying or conditioning the signal transmitted therebetween.

9. The assembly of claim 1 further including a grommet mounted on an end portion of said housing for generally sealing a housing aperture when the terminus is inserted in said receptacle.

10. An electro-optical contact coupling assembly, comprising:
    a housing;
    a converter for conversion of a signal between electrical form and optical form;
    an electrical contact electrically connected to said converter, said contact having a socket for electrical connection directly to an electrical cable connector for electrically interfacing said converter with an electrical system, said contact mounted within said housing;
    a receptacle for removably receiving an optical fiber terminus therein, said receptacle positioned adjacent said converter in order to facilitate transmission of the signal between said converter and the terminus, said receptacle mounted in said housing;
    a connector receiving a portion of said housing therein, said connector including an electrical conductor, said conductor positioned so that it generally covers at least a portion of said receptacle and said electrical contact when said housing is inserted in said connector in order to generally cover the terminus when inserted in said receptacle and to generally cover said electrical contact for providing EMI and RFI shielding of the terminus and said electrical contact.

11. The assembly of claim 10 wherein said receptacle includes a collar dimensioned to snugly fit around an enlarged portion of the terminus when the terminus is inserted in said receptacle, said collar having a diameter larger than a receptacle portion snugly fitting around an end portion of the terminus when the terminus is inserted in said receptacle.

12. The assembly of claim 10 wherein said contact is a triaxial contact for electrical connection directly to an electrical triaxial cable connector.

13. The assembly of claim 10 further including a grommet mounted on an end portion of said housing and generally covering an aperture of said housing when the terminus is inserted in said receptacle.

14. The assembly of claim 10 wherein said converter includes a laser.

15. The assembly of claim 14 wherein said connector includes a thermoelectric structure thermally connected to said laser and to a thermally conductive portion of said connector in order to remove heat from said laser.

16. The assembly of claim 15 wherein said thermoelectric structure includes a thermal conductor thermally connected to a rack when said connector is connected to the electrical system and mounted in the rack in order to generally allow transfer of heat from said laser to the rack.

17. The assembly of claim 15 wherein said thermoelectric structure includes:
a heat pump for removing heat from said laser; and
a sensor for sensing the temperature of said converter in order to control the temperature of said converter.

18. The assembly of claim 10 further including a mount mounted on said housing, said converter mounted in said mount in a position of generally lateral alignment with said receptacle in order to facilitate signal transfer between the terminus and said converter.

19. The assembly of claim 10 wherein said converter includes a photo diode for converting the signal from optical form to electrical form.

20. The assembly of claim 10 wherein said converter includes a light-emitting diode for converting the signal from electrical form to optical form.

21. The assembly of claim 10 wherein said converter includes an edge emitting diode for converting the signal from electrical form to optical form.

22. The assembly of claim 10 further including a retention clip mounted on said receptacle, said retention clip engaging the terminus when inserted in said receptacle in order to securely retain the terminus in a desired position of optical connection to said converter, said retention clip allowing manual release thereof from engagement with the terminus in order to allow removal of the terminus from said receptacle.

23. The assembly of claim 10 further including an amplifier mounted in said housing and electrically connected to said converter and said contact for amplifying the signal transmitted between said converter and said contact.

* * * * *